United States Patent [19]

Osterday et al.

[11] Patent Number: 5,054,370
[45] Date of Patent: Oct. 8, 1991

[54] VACUUM BOOSTER WITH DUAL DUROMETER REACTION DISC

[75] Inventors: Craig A. Osterday, Dayton; Donald M. Flory, Arcanum, both of Ohio

[73] Assignee: General Motors Corporation, Detroit, Mich.

[21] Appl. No.: 654,720

[22] Filed: Feb. 13, 1991

[51] Int. Cl.⁵ .............................................. F15B 9/10
[52] U.S. Cl. .................................................. 91/396.2
[58] Field of Search ................. 91/369.1, 369.2, 369.3, 91/369.4

[56] References Cited

U.S. PATENT DOCUMENTS

| | | | |
|---|---|---|---|
| 3,132,567 | 5/1964 | Ingres et al. | 91/369.2 |
| 4,643,075 | 2/1987 | Wagner | 91/369.2 |
| 4,719,842 | 1/1988 | Gautier | 91/369.2 |
| 4,984,506 | 1/1991 | Perez | 91/369.2 |

FOREIGN PATENT DOCUMENTS 195460 11/1984 Japan .................... 91/369.2

Primary Examiner—Edward K. Look
Assistant Examiner—F. Daniel Lopez
Attorney, Agent, or Firm—Ernest E. Helms

[57] ABSTRACT

A power booster assembly, has a dual-durometer reaction disc instead of the disc having a single durometer value throughout. The disc has an outer annular portion of a higher durometer value than the durometer value of the disc inner center portion. The higher durometer value is preferably on the order of 80 durometer and the lower durometer value is preferably on the order of 45 durometer. The outer annular portion transmit part of the reaction force to the booster power wall, and the inner center portion transmit the remainder of the reaction force to the reaction piston and thence to the booster input member. The disc may be made as a unitary part or may be made in two parts with the inner center portion being later inserted into and mechanically interlocked with the outer center portion.

10 Claims, 1 Drawing Sheet

VACUUM BOOSTER WITH DUAL DUROMETER REACTION DISC

FIELD OF THE INVENTION

The invention relates to reaction discs for power boosters, and particularly such discs which are made of a compressible rubber-like material. Discs of this type are used to transmit reaction forces to the booster input member and to the booster power wall so that the booster operator feels only a portion of the total reaction force being transmitted from the booster output member back to the booster.

BACKGROUND OF THE INVENTION

Power boosters have been used in vehicle brake systems, as well as in other systems, for many years. One of the more common power brake boosters is powered by vacuum generated by the vehicle engine or a vacuum pump. Such boosters have been using a rubber-like reaction disc which is contained in a reaction disc chamber in the booster power wall. The booster has an output member which has one end forming a wall of the reaction disc chamber, the output member being axially movable in the chamber. The other end of the reaction disc chamber is defined by an annular shoulder forming an outer diameter portion of the wall. The shoulder is a part of the booster power wall. A reaction piston is reciprocally received in the passage passing through the annular shoulder and forms the other part of the booster power wall. A reaction disc is located in the chamber. The disc is generally puck-shaped, having a circumferentially extending peripheral wall and oppositely disposed side walls. The peripheral wall has a diameter only slightly less than the diameter of the chamber. One of the side walls is engaged or engageable by the portion of the output member forming one chamber end wall. The other side wall is engaged or engageable on an annular outer surface thereof by the annular shoulder, and the inner surface of the other side wall is engaged or engageable by the end of the reaction piston forming the inner part of the other chamber end wall.

When the booster is actuated, the output member transmits reaction force to the one side wall of the reaction disc, and this force is resisted by the annular shoulder and the reaction piston as they engage the other side wall of the reaction disc. This force tends to compress the disc. One part of it is transmitted to the annular shoulder and the other part of it is transmitted to the end of the reaction piston. The ratio of these parts is determined by the ratio of the area of the shoulder to the area of the reaction piston end. Due to the compression of the disc, the disc peripheral diameter is increased and the disc may engage the cylindrical wall of the disc chamber, somewhat modifying the ratio of reaction forces. This compression also tends to cause some extrusion of the disc in the small annular space created by the smaller diameter of the output member in relation to the diameter of the reaction disc chamber.

Reaction discs in current use, and in use for many years past, have had one durometer or hardness value throughout the disc. In order to obtain good reaction force definition, this durometer or hardness value has resulted in reaction discs which are somewhat softer than they might otherwise be, and they tend to so expand and be extruded.

SUMMARY OF THE INVENTION

The invention herein disclosed and claimed relates to reaction discs which have dual durometer sections, with an annular harder disc section, indicated by a higher durometer value, and the inner disc section having a lower durometer value which may be about the same as the durometer value of the current production single durometer reaction discs. The different durometer sections of the disc may be created before molding of the disc is completed so that the disc in its completed form is a unitary disc. Alternatively, the two disc sections may be separately molded and then attached together so that the completed disc is similar to the unitary disc. The attachment of the discs may be mechanical or chemical, as by the use of appropriate glue. In either instance, the harder durometer outer peripheral section of the disc resists diametrical expansion and extrusion between the output member and the cylindrical wall of the disc.

DETAILED DESCRIPTION

Figure 1:
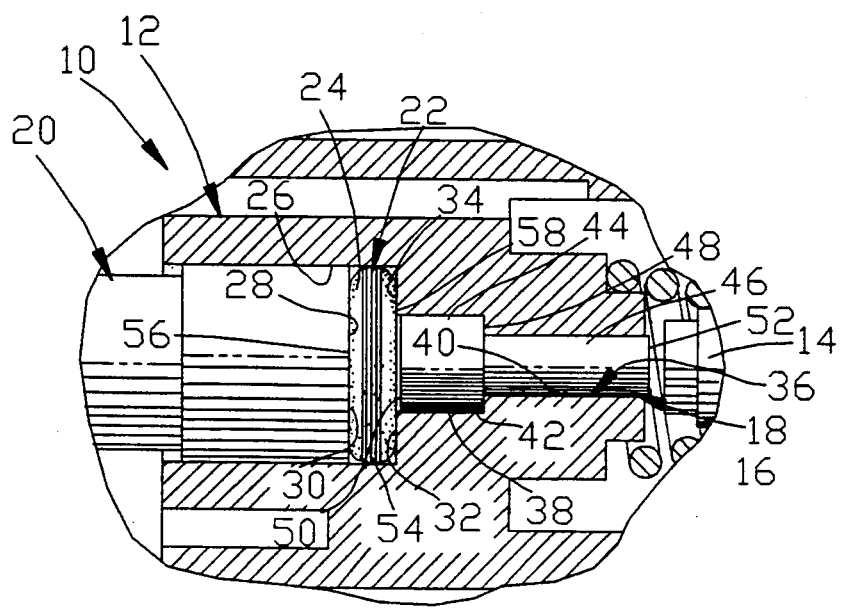
FIG. 1 is a fragmentary cross-section view of a part of a power booster showing the reaction disc embodying the invention in the reaction disc chamber.

The fragmentary part of the power booster assembly 10 of FIG. 1 is illustrated as being a part of a vacuum suspended, vacuum powered, power brake booster. The prior art is replete with such boosters of this general nature, as well as air suspended vacuum powered boosters and hydraulic pressure actuated boosters, using reaction discs. Examples of such patents include Wuellner et al U.S. Pat. No. 3,172,334; Gephart et al U.S. Pat. No. 4,069,742; Van House U.S. Pat. No. 4,096,696; Peeples U.S. Pat. No. 4,274,326; Schubert U.S. Pat. No. 4,319,455; and Melinat U.S. Pat. No. 4,445,330. This short list is by no means exhaustive.

The portions of booster assembly 10 shown in the drawing include the power wall 12, the booster input member 14 which is also the air valve for controlling the booster operation, the air valve return spring 16, the reaction piston 18, the booster output member 20, and the reaction disc 22.

The power wall 12 has a reaction disc chamber 24 formed in it. The circumferential wall of chamber 24 is defined by cylindrical wall 26. One side 28 of the chamber 24 is defined by the end surface 30 of the output member 20. Output member 20 is movably received in one end of the chamber 24. As is typical in power brake systems, output member 20 acts on a master cylinder (not shown) when the booster is actuated to move the power wall 12 and the output member 20 leftwardly as seen in FIG. 1. The other side 32 of the chamber 24 is defined in part by the annular shoulder 34. Shoulder 34 is formed by a part of the power wall 12. A reaction piston passage 36 is formed through the power wall 12 so as to open into chamber 24 through the inner opening of annular shoulder 34. Passage 36 has a larger diameter portion 38 at shoulder 34, and a smaller diameter portion 40 connecting portion 38 with the side of the power wall 12 adjacent the input member 14. Passage portions 38 and 40 cooperate to define another annular shoulder 42.

The reaction piston 18 is shaped to fit within passage 36, and has a larger diameter portion 44 and a smaller diameter portion 46. The side surface 48 of reaction piston portion 44 is engageable with shoulder 42. The forward end surface 50 of reaction piston 18 forms the other part of chamber side 32. The rear end surface 52 of reaction piston 18 is engageable by the input member 14 so that input force may be transmitted to the reaction piston as will be further described.

Figure 2:
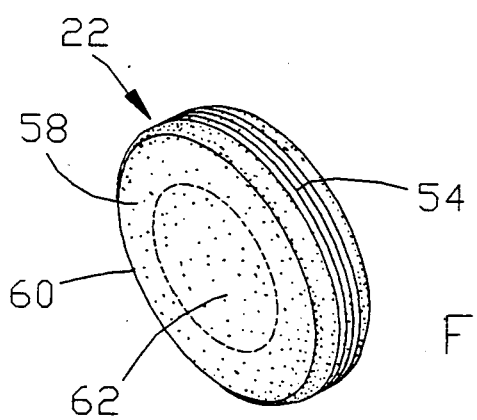
FIG. 2 is an isometric view of the reaction disc of FIG. 1 the direction of arrows 2—2 of FIG. 1. It illustrates the unitary duo-durometer disc having a higher durometer outer portion and a lower durometer inner portion.

The reaction disc 22 is located in chamber 24. It looks much like a hockey puck or a cookie, being round and flat. It has a peripheral surface 54 which is located immediately adjacent the chamber wall 26, one side surface 56 facing side 28 of output member 20, and an opposed side surface 58 facing shoulder 34 and reaction piston end surface 50. Disc 22 is shown in perspective in FIG. 2, with side surface 58 being clearly illustrated. Disc 22 has an outer annular portion 60 and an inner center portion 62. As shown in FIG. 2, the disc portions 60 and 62 are parts of a unitary disc. Portion 60 merely has a higher durometer value than does portion 62. It is preferred that portion 60 have a durometer value of about 80, with the preferred range being from about 70 to 90, or even 77 to 83. Portion 62 preferably has a durometer value of about 45, with the preferred range being from about 40 to 50, or even 42 to 48. Disc 22 is preferably molded as a unitary disc with these portions having high and low durometer values in the preferred ranges.

Figure 3:
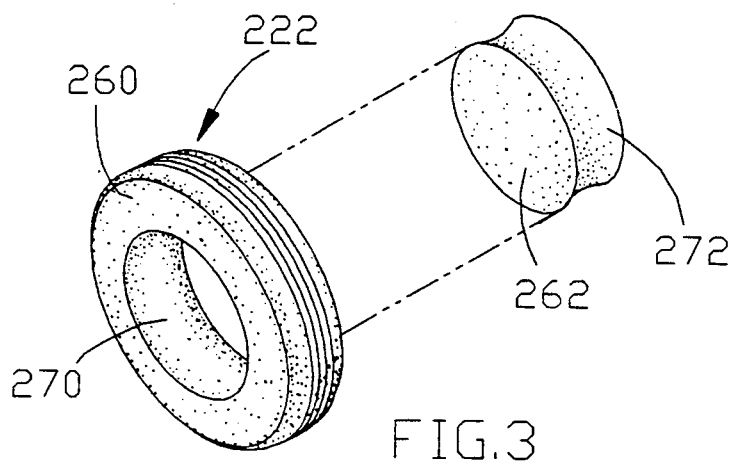
FIG. 3 is an exploded view of another embodiment of the invention. It illustrates the annular portion and the inner portion separately molded with different durometers, and then being assembled so that they are at least in part secured by the overlocking shape of the two discs.

A modified disc 222 is shown in FIG. 3 in expanded form. This disc is much like disc 22, but is made of two separate portions 260 and 262. Portion 260 is the outer annular portion having the higher durometer value and portion 262 is the inner center portion having the lower durometer value. The preferred durometer value ranges are the same as they are for disc 22.

In order to mechanically assemble and retain portions 260 and 262 together, the inner annular surface 270 of portion 260 is convex, and the outer annular surface 272 of portion 262 is concave in mating relation with surface 270. Inner center portion 262 is inserted in the opening defined by surface 270 so that surfaces 270 and 272 are in surface engagement. The convex-concave arrangement provides a mechanical interlock between portions 260 and 262. The mechanical interlock may be assisted by use of rubber-like adhesives if needed, but they are usually unnecessary. This two-part arrangement is sometimes easier to manufacture since the two disparate durometer values are sometimes more easily attained in separately molded pieces. It also permits some tailoring of the desired durometer values, since disc portions of different values (for example, durometer values of 75, 80 and 85 for portion 260 and durometer values of 42, 45 and 48 for portion 262) may be selectively combined to obtain desired characteristics in a family of boosters requiring different but closely related reaction ratios.

When the booster 10 is actuated, the air valve of which the input member is a part closes off the vacuum connection between the booster power chambers and then admits metered atmospheric air into the power chamber associated with the air valve, usually the rearward power chamber. At the same time, the forward movement of the air valve moves the reaction piston into contact with the reaction disc. The differential pressure acting on the power wall moves that wall forwardly (leftwardly as seen in FIG. 1), so that the power wall shoulder 34 exerts force on the outer annular portion 60 of disc 22 or 260 of annular portion 260. This force is transmitted through the reaction disc to the output member 20, which resists movement of the power wall because it is exerting force on a master cylinder or other mechanism. The resisting force creates the reaction force exerted by the entire end surface 30 of the output member across the entire reaction disc side surface 56. Disc 22 or disc 222 is therefore compressed by opposite forces acting on the opposite disc side surfaces. Since the reaction piston forward end surface 50 is also being pushed into force-transmitting engagement with disc side surface 58 or 258, it receives a percentage of the reaction force in a ratio of the area of end surface 50 to the total surface area of the chamber side wall 32, formed by surface 50 and the surface of shoulder 34. If, for example, the area of shoulder 34 is two times as great as the area of end surface 50, the reaction piston will transfer one-third of the reaction force to the input member 14, and that is the reaction force that will be sensed by the booster operator.

By having the inner center portion 62 or 262 have the lower durometer and the annular outer portion 60 or 260 the higher durometer, the inner center portion acts much like the prior art single durometer reaction disc. However, the outer annular portion is more resistant to compression, and deforms less. It therefore has less tendency to expand the disc outer peripheral surface 54 radially so that it engages and increases drag on the chamber wall 26.

This same characteristic also lessens the tendency of the disc to be extruded into the space between the output member 20 near its end surface 30 and the chamber wall 26. Beside decreasing damage to the reaction disc and therefore increasing its life, this also lessens undesirable resistance to movements of the output member in chamber 24 and contributes to a more precisely operating booster.

Reference characters: (Underlined numbers have arrows on lead lines, indicating a major component—usually with sub-components.)

| | | | |
|---|---|---|---|
| 10 | BRAKE ASSEMBLY | 12 | POWER WALL |
| 14 | booster input member | 16 | air valve return spring |
| 18 | REACTION PISTON | 20 | BOOSTER OUTPUT MEMBER |
| 22 | REACTION DISC | 24 | reaction disc chamber |
| 26 | cylindrical wall | 28 | one side of 24 |
| 30 | end surface of 20 | 32 | other side of 24 |
| 34 | annular shoulder | 36 | reaction piston passage |
| 38 | larger dia. portion of 36 | 40 | smaller dia. portion of 36 |
| 42 | annular shoulder of 36 | 44 | larger dia. portion of 18 |
| 46 | smaller diameter portion of 18 | 48 | side surface of 44 |
| 50 | forward end surface of 18 | 52 | rear end surface of 18 |
| 54 | peripheral surface of 22 | 56 | one side surface of 22 |
| 58 | other side surface of 22 | 60 | outer annular portion of 22 |
| 62 | inner center portion of 22 | | |
| 222 | modified reaction disc in place of disc 22 | | |
| 260 | outer annular portion of 222 | | |
| 262 | inner center portion of 222 | | |
| 270 | inner annular surface of 260 | | |
| 272 | outer annular surface of 262 | | |

We claim:

1. A power booster reaction disc for use in a power brake booster and the like, said disc comprising:
a compressible disc body having an outer diameter portion having a high durometer in the range of 70 to 90 durometer and an inner diameter portion having a low durometer in the range of 40 to 50 durometer.

2. The reaction disc of claim 1 in which said outer diameter portion is adapted to transmit reaction forces between a booster output member and a booster power wall annular shoulder, and said inner diameter portion is adapted to transmit reaction forces between the booster output member and a booster reaction piston operatively connected to the booster input member.

3. The reaction disc of claim 1 in which said outer diameter portion and said inner diameter portion are united parts of a unitary reaction disc.

4. The reaction disc of claim 1 in which said outer diameter portion is an annulus and said inner diameter portion is a plug fitting in said annulus and mechanically secured thereto.

5. The reaction disc of claim 1 in which said outer diameter portion is a toroidal annulus having a convex curved inner diameter surface and said inner diameter portion is a plug having a concave curved outer diameter surface mating with said convex curved inner diameter surface so at to be mechanically secured in said toroidal annulus by engagement of said mating surfaces.

6. In a power brake booster having a power piston, a reaction chamber formed in said piston having an annular shoulder therein dividing the reaction chamber into a larger diameter forward chamber section and a smaller diameter rearward chamber section, a reaction piston reciprocably received in said rearward chamber section and having its rearward end adapted to be engaged in force translating relation with a booster control valve when the booster is actuated, said reaction piston having its forward end surface positioned axially near the shoulder, an output member having its rear end reciprocably received in said forward chamber section with its end surface facing said shoulder and said reaction piston forward end surface, said output member being adapted to actuate a device to be powered by said booster, and a resilient rubber-like reaction disc in said forward chamber section having its forward surface in engagement with the output member rear end surface, its outer periphery immediately adjacent the outer wall of said forward chamber section, an annular part of its rearward surface in engagement with said shoulder, and a center part of its rearward surface at least incipiently engagageable with the forward end surface of said reaction piston, the improvement in said reaction disc comprising:
said reaction disc having an outer annular part and an inner center part, said outer annular part being the annular part in engagement with said shoulder and said inner center part being the part of its rearward surface at least incipiently engageable with the reaction piston forward end surface, said outer annular part being made of a higher durometer rubber-like material than the durometer rating of said said inner center part.

7. For use in a power booster having a power wall reaction chamber defined by a circumferentially extending outer diameter wall and a rear wall defined by an annular shoulder formed as a part of the power wall and one end surface of a reaction piston input member and a front wall defined by a booster output member end surface, the front wall being movable in the reaction chamber toward and away from the rear wall annular shoulder and the reaction piston input member being movable in the booster power wall toward and away from the front wall; a reaction disc comprising:
an outer annular part and an inner center part connected with said outer annular part, said outer annular part having one side surface adapted to engage the booster power wall annular shoulder and an oppositely disposed side surface being adapted to engage the reaction chamber front wall, said inner center part having one side surface being adapted to engage the reaction piston input member one end surface and an oppositely disposed side surface being adapted to engage the reaction chamber front wall, said reaction disc inner and outer annular parts being made of a compressible rubber-like material, the durometer rating of said outer annular part being about 80 durometer and the durometer rating of said inner center part being about 45 durometer.

8. The reaction disc of claim 7, said outer annular part and said inner center part being integral parts of a unitary reaction disc.

9. The reaction disc of claim 7, said outer annular part and said inner center part being separately made disc parts which are assembled so that said inner center part is fitted within said outer annular part in retained relation.

10. The reaction disc of claim 7, said lower durometer inner center part being more compressible than said higher durometer outer annular part when said disc is subjected to compressive forces acting on opposited sides thereof, lessening the tendency for extrusion of said outer annular part under compression loads in the range to which the reaction disc is to be subjected during operation of the power booster.

* * * * *